Patented Dec. 11, 1923.

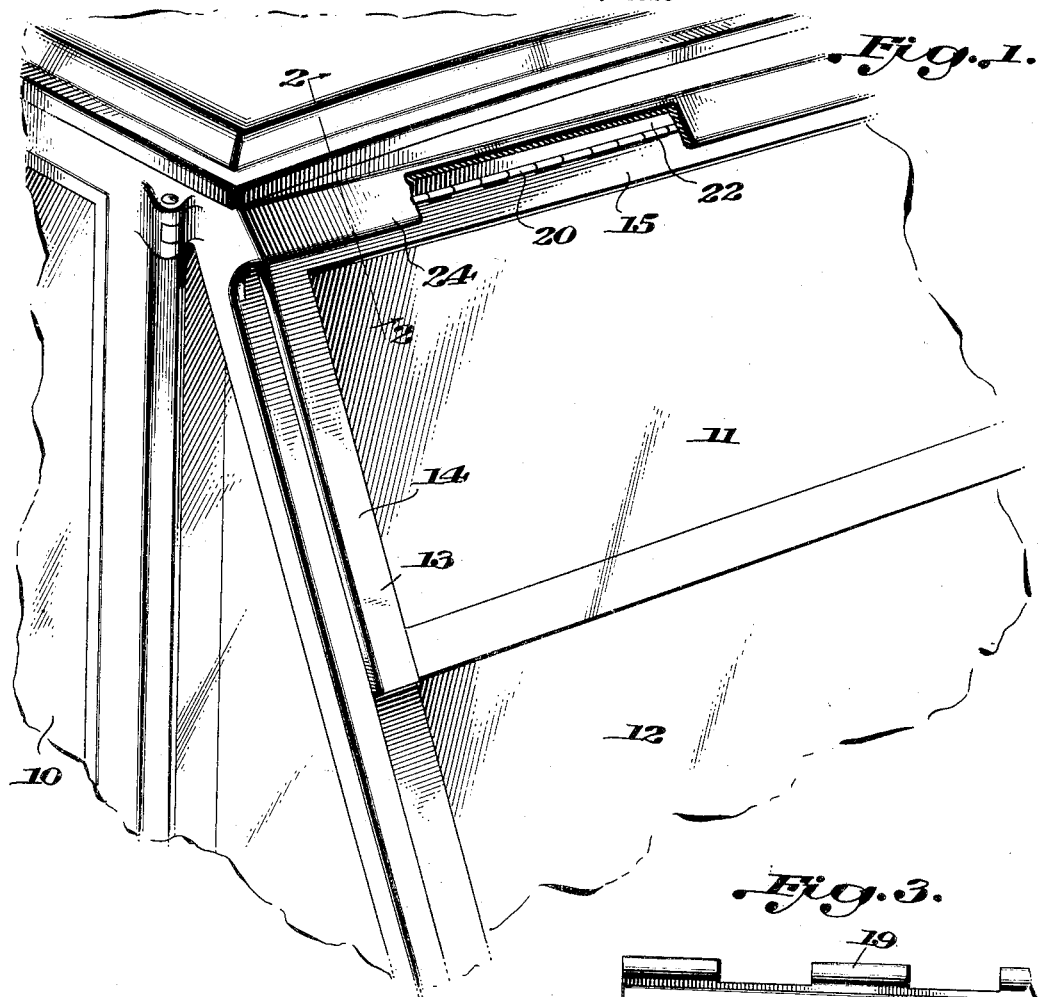
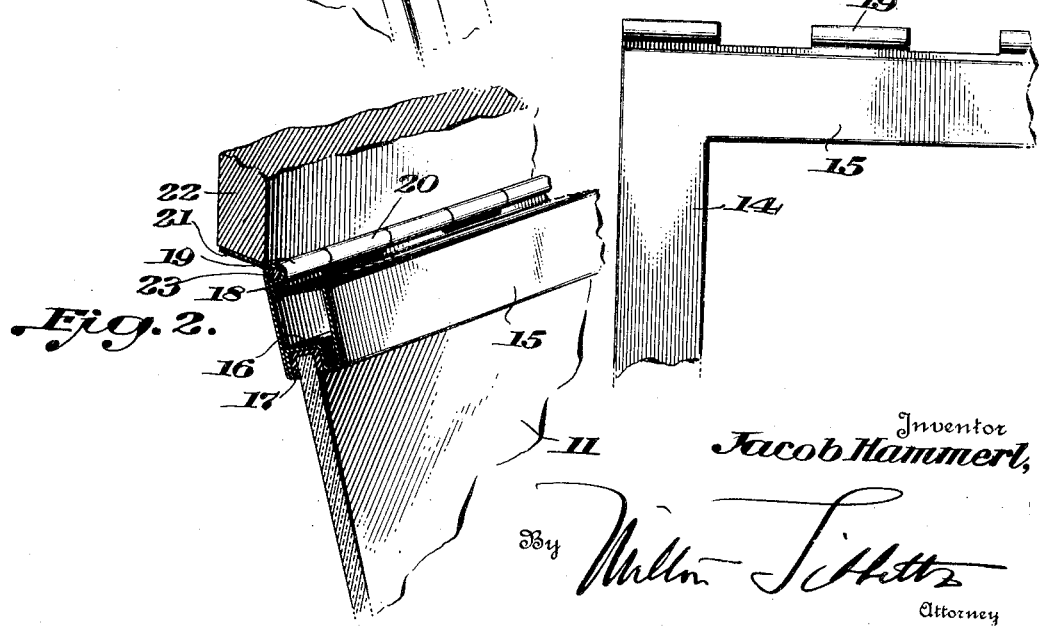

1,476,816

UNITED STATES PATENT OFFICE.

JACOB HAMMERL, OF DETROIT, MICHIGAN, ASSIGNOR TO PACKARD MOTOR CAR COMPANY, OF DETROIT, MICHIGAN, A CORPORATION OF MICHIGAN.

WINDSHIELD.

Application filed November 1, 1920. Serial No. 421,012.

*To all whom it may concern:*

Be it known that I, JACOB HAMMERL, a citizen of the United States, and resident of Detroit, Wayne County, State of Michigan, have invented certain new and useful Improvements in Windshields, of which the following is a specification.

This invention relates to motor vehicles, and more particularly to windshield construction.

One of the objects of the invention is to simplify the mounting of windshields by eliminating unnecessary parts.

Another object of the invention is to provide a windshield mounting having a minimum number of parts, and, furthermore, to provide a construction which will be simple and rigid, and will not come apart under the strains to which it is subjected in use.

Another object of the invention is to protect the hinge joint between the windshield and body of a motor vehicle from exposure to rain.

Further objects of the invention will appear from the following specification taken in connection with the drawings which form a part of this application, and in which:

Fig. 1 is a perspective view, illustrating a windshield mounting constructed in accordance with my invention;

Fig. 2 is a perspective detail view, taken substantially on line 2—2 of Fig. 1, and showing a portion of a windshield frame member constructed in accordance with my invention; and Fig. 3 illustrates the frame member in front elevation.

Referring to the drawings, I have shown in Fig. 1 a portion of the front end of a closed body 10, of motor vehicle, the upper sash 11 of the windshield and the lower sash 12.

The sash 11 is mounted in a frame 13, having side rails or frame members 14 (only one of these members being shown) and an upper rail or frame member 15. These members are preferably formed of sheet metal, and as shown in Fig. 2, the rails are recessed as indicated at 16, to receive the edges of the sash, a rubber cushion member 17 being interposed between the rail and the sash. The upper frame member or rail is substantially rectangular in cross section, and the free edges are brought together and extended laterally, as shown at 18, one of the edges being prolonged beyond the other and provided with spaced-apart, turned-over portions 19, which form piano hinge members. The hinge members 19 co-act with complementary hinge members 20, formed on a plate 21, secured to a body frame member 22, and a pintle 23 extends through these hinge members and forms the pivot for the upper sash of the windshield. The laterally extending portions 18 of the windshield rail or frame member 15 may be brazed or welded together if desired.

In order to protect the hinge from the weather, the upper portion of the body frame for the windshield is extended over the hinge, as shown at 24, forming eaves.

In the illustration of the construction, one of the side rails 14 and the upper rail 15 are shown as integral, but it will be understood that these members could be formed separate and secured together in any suitable manner, if desired.

From the above description, it will be obvious that by forming the upper windshield rail and hinge member integral and of one piece, all unnecessary parts have been eliminated, and that no rivets or other connecting means are necessary. It will also be evident that the construction may be economically manufactured and will be rigid and efficient.

Although one specific embodiment of the invention has been illustrated and described, it will be evident to those skilled in the art that the invention is capable of modification, and it will, therefore, be understood that changes in the construction and in the arrangement of the cooperating parts may be made without departing from the spirit or scope of the invention, as expressed in the following claims.

Having described my invention, what I claim and desire to secure by Letters Patent is:

1. A one-piece, sheet metal frame member, substantially rectangular in section, and having a recessed portion adjacent one edge for receiving a sash, the free ends of said member being extended laterally and brazed together, one of said ends projecting beyond the other end and having spaced-apart, hinge members formed thereon.

2. A windshield frame member comprising a one piece sheet metal tube of substantially rectangular cross section, said tube having a longitudinal recess along one side to receive the sash and having one free end of the sheet metal extending laterally beyond the tube and forming hinge members, the other free end of the sheet metal being secured adjacent the base of said hinge members.

In testimony whereof I affix my signature.

JACOB HAMMERL.